United States Patent
Matlack et al.

(10) Patent No.: US 10,226,905 B2
(45) Date of Patent: Mar. 12, 2019

(54) MATERIAL TENSIONING SYSTEM

(71) Applicant: The Boeing Company, Chicago, IL (US)

(72) Inventors: Mike P. Matlack, St. Charles, MO (US); Stephen J. Morgan, Cypress, CA (US); Thomas K. Tsotsis, Santa Ana, CA (US); James R. Fox, University City, MO (US); Randall D. Wilkerson, O'Fallon, MO (US)

(73) Assignee: the boeing company, chicago, IL (US)

( * ) Notice: Subject to any disclaimer, the term of this patent is extended or adjusted under 35 U.S.C. 154(b) by 341 days.

(21) Appl. No.: 14/861,158

(22) Filed: Sep. 22, 2015

(65) Prior Publication Data

US 2017/0080650 A1 Mar. 23, 2017

(51) Int. Cl.
*B29C 70/56* (2006.01)
*B29C 70/46* (2006.01)
(Continued)

(52) U.S. Cl.
CPC ............ *B29C 70/56* (2013.01); *B29C 51/004* (2013.01); *B29C 51/262* (2013.01); *B29C 70/46* (2013.01);
(Continued)

(58) Field of Classification Search
CPC ....... B29C 70/56; B29C 70/46; B29C 70/541; B29C 70/48; B29C 70/74; B29C 70/70;
(Continued)

(56) References Cited

U.S. PATENT DOCUMENTS

| 3,531,830 A | * | 10/1970 | Gelin | ...................... B29C 43/00 |
| | | | | 264/325 |
| 3,844,701 A | * | 10/1974 | Rockwell | ................ B29C 35/02 |
| | | | | 425/348 R |

(Continued)

FOREIGN PATENT DOCUMENTS

| DE | 19731561 A1 | * | 1/1999 | ....... B29C 45/14262 |
| DE | 19731561 A1 | | 1/1999 | |

(Continued)

OTHER PUBLICATIONS

Co-pending U.S. Appl. No. 14/861,197, filed Sep. 22, 2015; Inventors Matlack, et al.

(Continued)

*Primary Examiner* — Jacob T Minskey
*Assistant Examiner* — Cedrick S Williams
(74) *Attorney, Agent, or Firm* — MH2 Technology Law Group LLP (57) ABSTRACT

A system and method for forming an item from a material, which may include elongated fibers and/or stretched broken fibers. The material is placed on a first clamping portion, which is placed on a fixture. A second clamping portion is placed against the material and the first clamping portion and secured together, forming a clamping assembly. The clamping assembly is removed from the fixture and placed on a first die portion, having a first profile. A second die portion is also provided, having a second profile. In forming the item, at least one of the first die portion and the second die portion are moved toward each other such that a second surface of the first die portion and a first surface of the second die portion contact and form the material into the item generally replicating the first profile and the second profile.

22 Claims, 10 Drawing Sheets

(51) Int. Cl.
  *B29C 51/00* (2006.01)
  *B29C 51/26* (2006.01)
  *B29K 105/14* (2006.01)
  *B29K 101/12* (2006.01)
  *B29C 51/08* (2006.01)

(52) U.S. Cl.
  CPC .......... *B29C 51/082* (2013.01); *B29C 51/264* (2013.01); *B29K 2101/12* (2013.01); *B29K 2105/14* (2013.01)

(58) Field of Classification Search
  CPC ....... B29C 70/467; B29C 43/00; B29C 43/04; B29C 2101/12; B29C 2105/12; B29C 2105/14; B29C 33/307; B29C 33/306; B29C 33/301; B29C 33/0088; B29C 2043/143; B29C 2043/144; B29C 2043/148; B29C 51/262; B29C 51/082; B29C 33/22
  USPC .................................. 425/113, 111; 264/229
  See application file for complete search history.

(56) References Cited

U.S. PATENT DOCUMENTS

| | | | | |
|---|---|---|---|---|
| 4,416,175 A * | 11/1983 | Bettner | ................... | B29C 70/08 83/29 |
| 5,814,270 A | 9/1998 | Smith | | |
| 6,264,454 B1 * | 7/2001 | Hale | ...................... | B29C 31/08 264/145 |
| 8,388,335 B2 * | 3/2013 | Littlejohn | .............. | B21D 43/26 271/195 |
| 2004/0118504 A1 * | 6/2004 | Herrmann | ............. | B29C 43/003 156/160 |
| 2005/0127566 A1 * | 6/2005 | Chotard | .................. | B29C 70/46 264/320 |
| 2007/0042072 A1 * | 2/2007 | Johns | ..................... | B29C 43/36 425/394 |
| 2011/0115124 A1 * | 5/2011 | Barlag | .................. | B29C 53/564 264/258 |
| 2013/0101694 A1 * | 4/2013 | Theinert | ................. | B29B 11/16 425/383 |
| 2014/0374946 A1 * | 12/2014 | Prebil | .................. | B29C 43/222 264/165 |
| 2015/0217488 A1 * | 8/2015 | Allman | .................. | B29C 70/48 264/152 |
| 2017/0226274 A1 * | 8/2017 | Harrington | ........ | C08G 59/4021 |

FOREIGN PATENT DOCUMENTS

| | | | | |
|---|---|---|---|---|
| DE | 19922799 A1 * | 11/2000 | ............. | B29C 70/48 |
| FR | 2018129 A1 * | 5/1970 | ........... | B29C 33/202 |
| JP | H11115041 A | 4/1999 | | |
| JP | H11254517 A | 9/1999 | | |
| WO | 2008090543 A1 | 7/2008 | | |

OTHER PUBLICATIONS

European Search Report dated Feb. 17, 2017 in corresponding European Patent Application No. 16175985.7.

\* cited by examiner

MATERIAL TENSIONING SYSTEM

STATEMENT REGARDING FEDERALLY SPONSORED RESEARCH

This invention was made with Government support under FA8650-14-C5612 awarded by the Department of Defense. The government has certain rights in this invention.

TECHNOLOGICAL FIELD

The present disclosure relates generally to forming a component or item from a material, and in particular, to systems and methods for the tensioning of a material being molded, including a thermoplastic material having elongated fibers, such as stretched broken fibers.

BACKGROUND

Formation of items from fiber-containing materials, such as thermoplastic materials having elongated fibers and/or stretched broken fibers, can present challenges in that if the material is not tensioned properly during formation of the item (which may involve imposition of relatively high temperatures and/or pressures) the fibers could tend to move, or "swim," which could potentially compromise the properties of the item, such as the strength and/or mechanical properties of the item. Thus, tensioning is desired to facilitate fiber alignment in the material during the forming process.

More specifically, during the formation process, the material, such as in the case of a thermoplastic material, may become viscous and flow, and may actually flow from a molding configuration, such as, a die or press, which could consequently starve the item of the needed amount of material and/or cause an imbalance in the desired ratio of the material to the fibers for a particular application. The subsequent removal and/or cleanup of such material after it flows and perhaps sets may cause an increase in manufacturing time and costs and may negatively impact production efficiencies in forming an item.

Therefore, it may be desirable to have systems and methods that take into account the issues discussed above, as well as possibly other issues.

BRIEF SUMMARY

The following is a non-exhaustive list of examples, which may or may not be claimed, of the subject matter according the present disclosure.

According to one aspect of example implementations of the present disclosure, systems and methods are provided for forming an item from a material, and in one such example implementation, a system is set forth for forming an item from a material, the system including a first die portion having a first surface and a second surface generally opposite the first surface, which defines a first profile, and a second die portion having an first surface and a second surface generally opposite the first surface of the second die portion, which defines a second profile. A first clamping portion is provided defining a first die-receiving opening, as is also a second clamping portion defining a second die-receiving opening. At least one fastener is adapted to secure together the first clamping portion and the second clamping portion with the material therebetween to form a clamping assembly, wherein the first clamping portion is adapted to receive the material and to expose the material to the first die-receiving opening, and the first die-receiving portion is adapted to receive at least one of the first die portion and the second die portion. The second clamping portion is adapted to contact the material and to expose the material to the second die-receiving opening, and the second die-receiving portion is adapted to receive at least one of the first die portion and the second die portion. Also, at least one of the first die portion and the second die portion are adapted to move toward each other such that the second surface of the first die portion and the first surface of the second die portion substantially simultaneously contact via the first die-receiving opening and the second die-receiving opening, respectively, to form the material into the item having portions generally replicating portions of the first profile and the second profile.

In some example implementations, the system may include the first clamping portion being generally frame-shaped and having an upstanding flange extending substantially adjacent to and substantially about the perimeter of the first die-receiving opening, and may also include the second clamping portion being generally frame-shaped and having recess extending substantially adjacent to and substantially about the perimeter of the second die-receiving opening, wherein the recess is adapted to receive the flange of the first clamping portion, and upon the flange being received within the recess, the material is substantially restrained from flowing from the clamping assembly.

In some example implementations the system may also include a fixture and the first clamping portion being adapted for placement in a generally mating relationship on the fixture and/or the clamping assembly being adapted to hold the material in tension substantially across at least one of the first die-receiving opening and the second die-receiving opening.

In some example implementations the system may further include at least one spring device on the second clamping portion adapted to contact the first surface of the second die portion as at least one of the first die portion and the second die portion move toward each other and/or at least one adjustable stop device extending from the first die portion and adapted to contact the first surface of the second die portion, wherein the stop device is configured to engage with first surface of the second die portion as at least one of the first die portion and the second die portion move toward each other.

In some example implementations, the system may include the first profile of the first die portion having a generally peripherally-extending first ramp inclined from the general direction of the second surface of the first die portion toward the first surface of the first die portion, and additionally, the second profile of the second die portion including a generally peripherally-extending second ramp inclined from the general direction of the first surface of the second die portion toward the second surface of the second die portion, wherein the first ramp is configured such that the material is forced against the first ramp, and the second ramp is configured such that the material is forced against the first ramp, as at least one of the first die portion and the second die portion move toward each other. Moreover, in another example implementation, and the first angle and the second angle generally mirror one another such that each of the first ramp and the second ramp remains generally parallel with respect to one another as the first die portion and the second die portion experience relative movement with respect to one another.

In some example implementations the system may also include at least one spring device extending from the second clamping portion and adapted to contact the first surface of the second die portion as at least one of the first die portion and the second die portion move toward each other, and may further include at least one spring shim adapted to contact the spring device and to allow selective adjustment of the distance by which the spring device extends from the second clamping portion.

In certain implementations the system may also include at least at least one preforming member configured to contact and force a sufficient quantity of the material to within at least one of the first die-receiving opening and the second die-receiving opening for use in forming the material into the item having portions generally replicating portions of the first profile and the second profile.

In some example implementations the system may still further include at least one adjustable stop device extending from the first die portion and adapted to contact the first surface of the second die portion as at least one of the first die portion and the second die portion move toward each other, and at least one stop shim adapted to contact the stop and to allow selective adjustment of the distance by which the stop device extends from the second clamping portion.

According to another aspect of example implementations of the present disclosure, a system is set forth for forming an item from a stretched broken fiber-containing material, the system including a first die portion with a first surface and a second surface generally opposite the first surface which defines a first profile, and a second die portion having an first surface and a second surface generally opposite the first surface of the second die portion, which defines a second profile. A first clamping portion is provided defining a first die-receiving opening, as is also a second clamping portion defining a second die-receiving opening. At least one fastener is adapted to secure together the first clamping portion and the second clamping portion with the stretched broken fiber-containing material therebetween to form a clamping assembly, wherein the first clamping portion is adapted to receive the stretched broken fiber-containing material and to expose the stretched broken fiber-containing material to the first die-receiving opening, and the first die-receiving portion is adapted to receive at least one of the first die portion and the second die portion. The second clamping portion is adapted to contact the stretched broken fiber-containing material and to expose the stretched broken fiber-containing material to the second die-receiving opening, and the second die-receiving portion is adapted to receive at least one of the first die portion and the second die portion. Also, at least one of the first die portion and the second die portion are adapted to move toward each other such that the second surface of the first die portion and the first surface of the second die portion substantially simultaneously contact via the first die-receiving opening and the second die-receiving opening, respectively, to form the stretched broken fiber-containing material into the item having portions generally replicating portions of the first profile and the second profile.

According to a further aspect of example implementations of the present disclosure, a method is set forth for forming an item and includes placing a first clamping portion on a fixture and placing a material from which to form the item on the first clamping portion. A second clamping portion is placed substantially adjacent the material, and the second clamping portion, the first clamping portion, and the material therebetween are secured together to form a clamping assembly. The clamping assembly is removed from the fixture, and the clamping assembly is placed on at least one of a first die portion having a first profile and a second die portion having a second profile. And, at least one of the first die portion and the second die portion is moved toward each other such that a second surface of the first die portion and a first surface of the second die portion substantially simultaneously contact and form the material into the item generally replicating the first profile and the second profile.

In some example implementations, the method may include placing the material in tension during the step of securing together the second clamping portion, the first clamping portion, and the material therebetween to form the clamping assembly, and additionally, may include the material having elongated fibers, including without limitation, stretched broken fibers, and placing the material in tension to generally align the fibers with respect to one another during the step of securing together the second clamping portion, the first clamping portion, and the material therebetween to form the clamping assembly, and further, curing the item while at least one of the second surface of the first die portion and the first surface of the second die portion substantially simultaneously contacts the material.

In some example implementations, the method may also include engaging a first surface of the second die portion with a spring device on the second clamping portion to provide a clamping force on the clamping assembly, and/or engaging a stop device on the first die portion with a first surface of the second die portion, during the step of moving at least one of the first die portion and the second die portion toward each other.

In some other example implementations, the method may include forcing the material against at least one of the first profile and the second profile in order to draw in a sufficient quantity of the material to within at least the first clamping portion such that material is not over-stressed or torn, prior to the step of moving at least one of first die portion and the second die portion toward each other and forming the material into the item having generally the first profile and the second profile In some example implementations, the method may further include the first profile of the first die portion including a generally peripherally extending first ramp inclined from the direction of a second surface of the first die portion toward a first surface of the first die portion, and/or the second profile of the second die portion including a generally peripherally extending second ramp inclined from the direction of a first surface of the second die portion toward a second surface of the second die portion, and the step of moving at least one of the first die portion and the second die portion toward each other including forcing the material against the first ramp of the first die portion.

In some example implementations, the method may additionally include trimming material extending beyond at least one of the first clamping portion and the second clamping portion of the clamping assembly.

In some example implementations, the method may also include heating at least one of the first die portion and the second die portion prior to or during the step of moving at least one of the first die portion and the second die portion toward each other to form the material into the item.

In some example implementations, the method may include elongating the material a predetermined amount during the step of moving at least one of first die portion and the second die portion toward each other, and may further include detaching the item from the material held in the clamping assembly after the step forming of the material into the item.

The features, functions and advantages discussed herein may be achieved independently in various example implementations or may be combined in yet other example implementations further details of which may be seen with reference to the following description and drawings.

BRIEF DESCRIPTION OF THE DRAWINGS

Having thus described example implementations of the disclosure in general terms, reference will now be made to the accompanying drawings, which are not necessarily drawn to scale, and wherein:

Each figure shown in this disclosure shows a variation of an aspect of the embodiments presented, and only differences will be discussed in detail.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Like reference numerals refer to like elements throughout.

Example implementations of the present disclosure are generally directed to a material tensioning system. Example implementations of the present disclosure may find use in a variety of industries, including, without limitation, the aerospace, automotive, marine, construction, medical, and other industry sectors.

Figure 1:
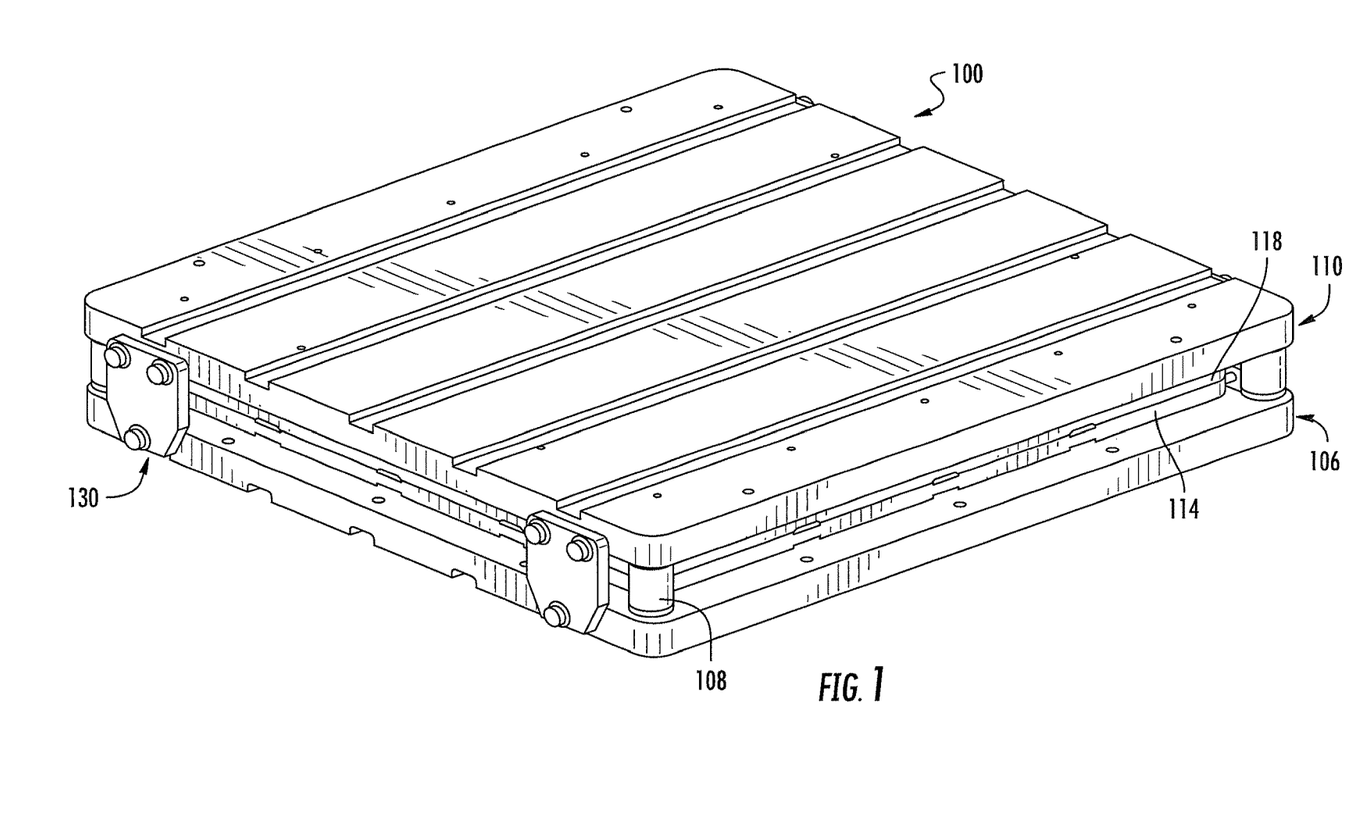
FIG. 1 is a schematic view of a material tensioning system according to one or more example implementations of the present disclosure.
Figure 7:
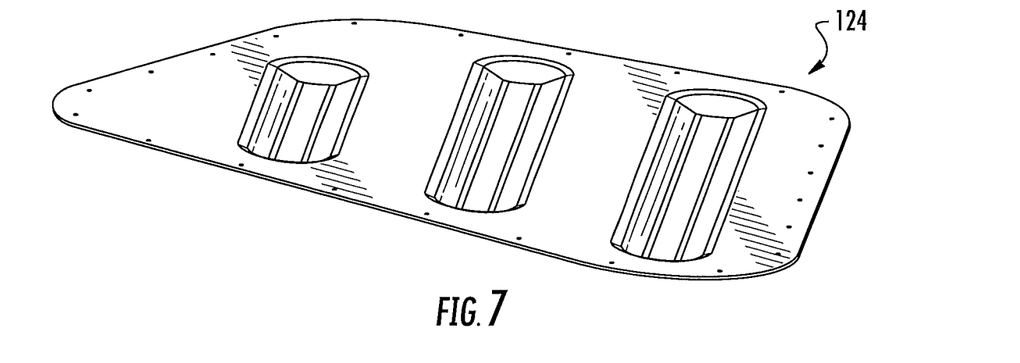
FIG. 7 is a schematic view of an example item formed out of material according to one or more example implementations of the present disclosure.

An example implementation of a material tensioning system, or "system," generally 100, for forming an article, item, component, etc., and with which methods as disclosed herein may be practiced, is shown in detail in the attached figures. Turning to FIG. 1, system 100 for forming an item 124 (FIG. 7) from a material includes a first, or lower, die, or die portion, generally 106, a second, or upper, die, or die portion, generally 110. The material, in one example, includes elongated fibers, which may include, in certain implementations, stretched broken fibers.

Figure 1A:
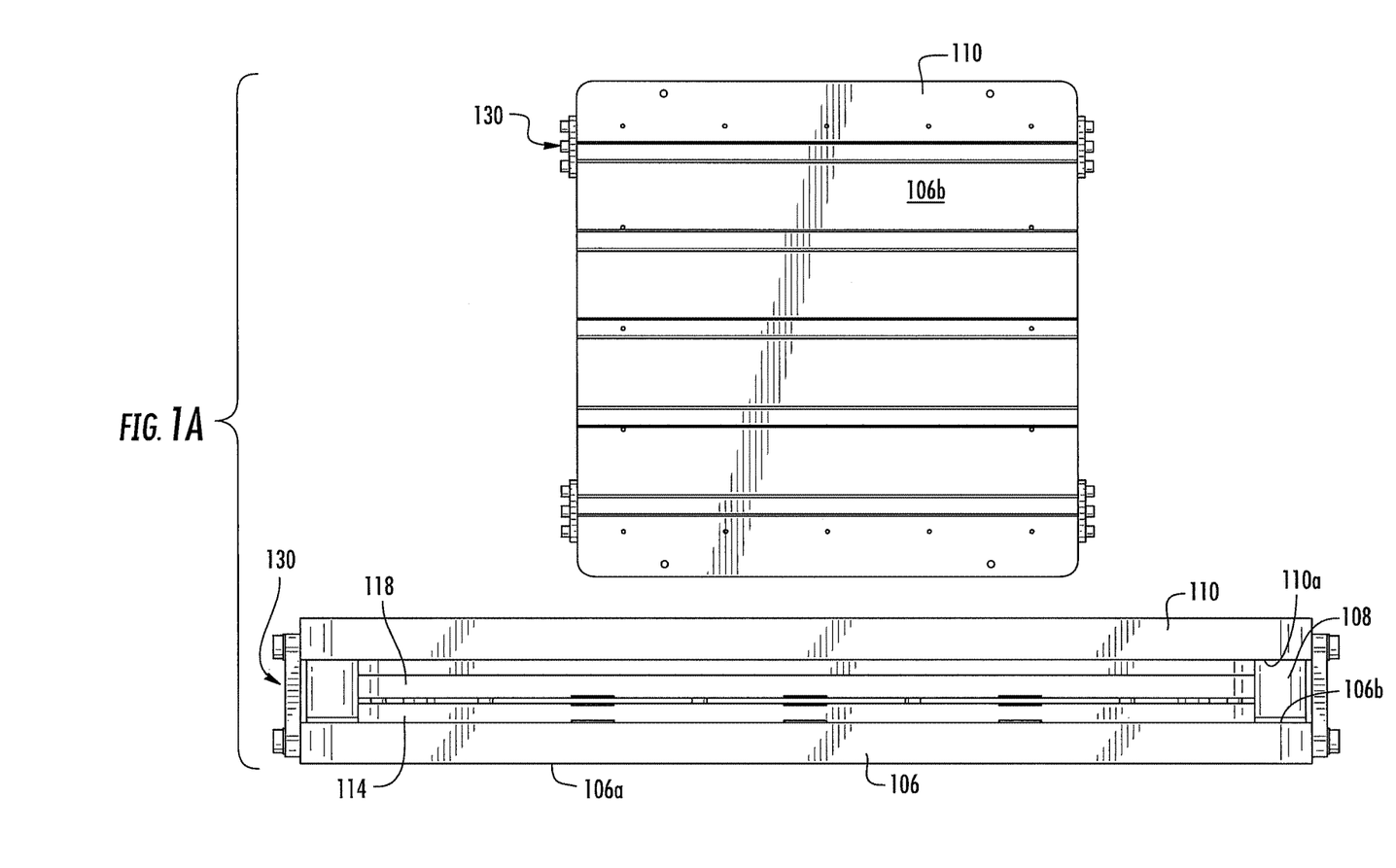
FIG. 1A includes schematic plan and side elevational views of the material tensioning system shown in FIG. 1.
Figure 2:
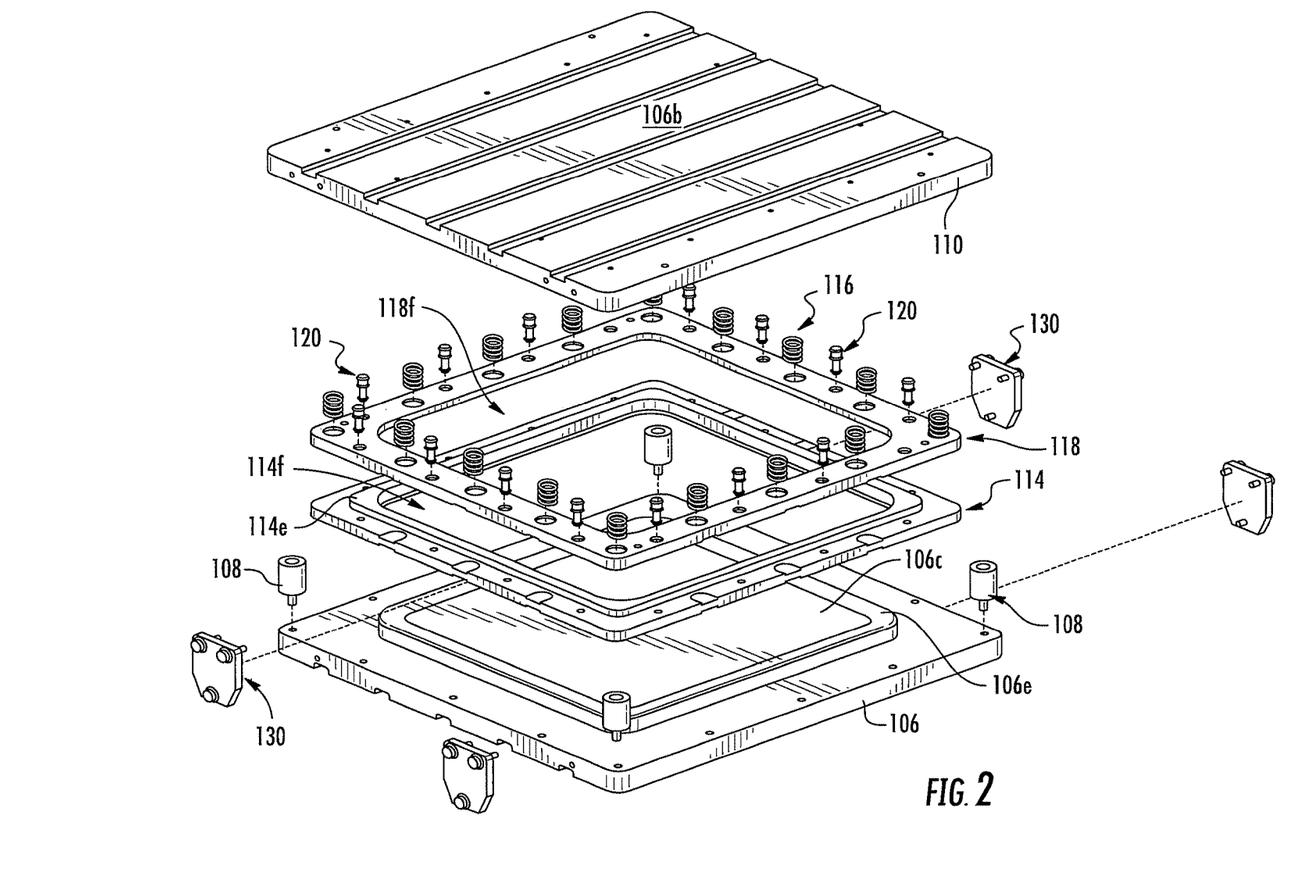
FIG. 2 is a schematic exploded view of a material tensioning system according to one or more example implementations of the present disclosure.
Figure 5:
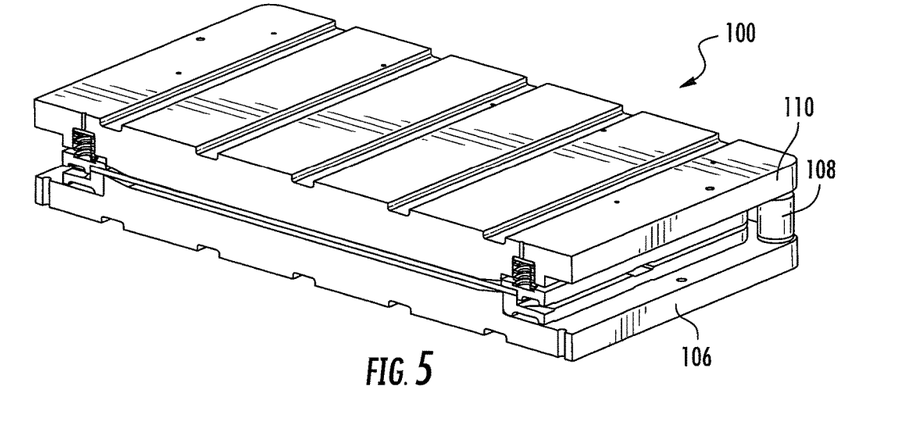
FIG. 5 is a schematic sectional view of a clamping assembly and a lower die portion and a second, or upper, die portion, according to one or more example implementations of the present disclosure.
Figure 5A:
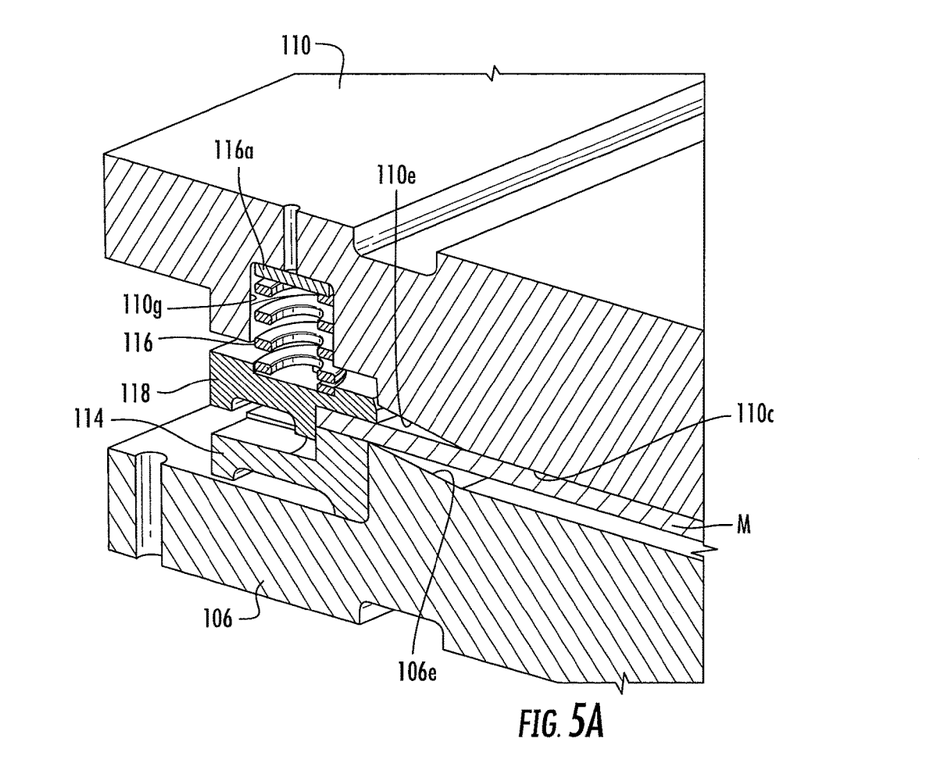
FIGS. 5A and 6 are schematic sectional views of the clamping assembly, lower die portion, and upper die portion according to one or more example implementations of the present disclosure.

As shown in FIGS. 1A, 2, and 5A, lower die 106 defines a first, or lower, surface 106a and a second, or upper, surface 106b generally opposite lower surface 106a and also defines a first, or lower die, profile 106c. Second die 110 has a first, or lower, surface 110a and a second, or upper, surface 110b generally opposite first surface 110a and also defines a second, or upper die, profile 110c.

Figure 3:
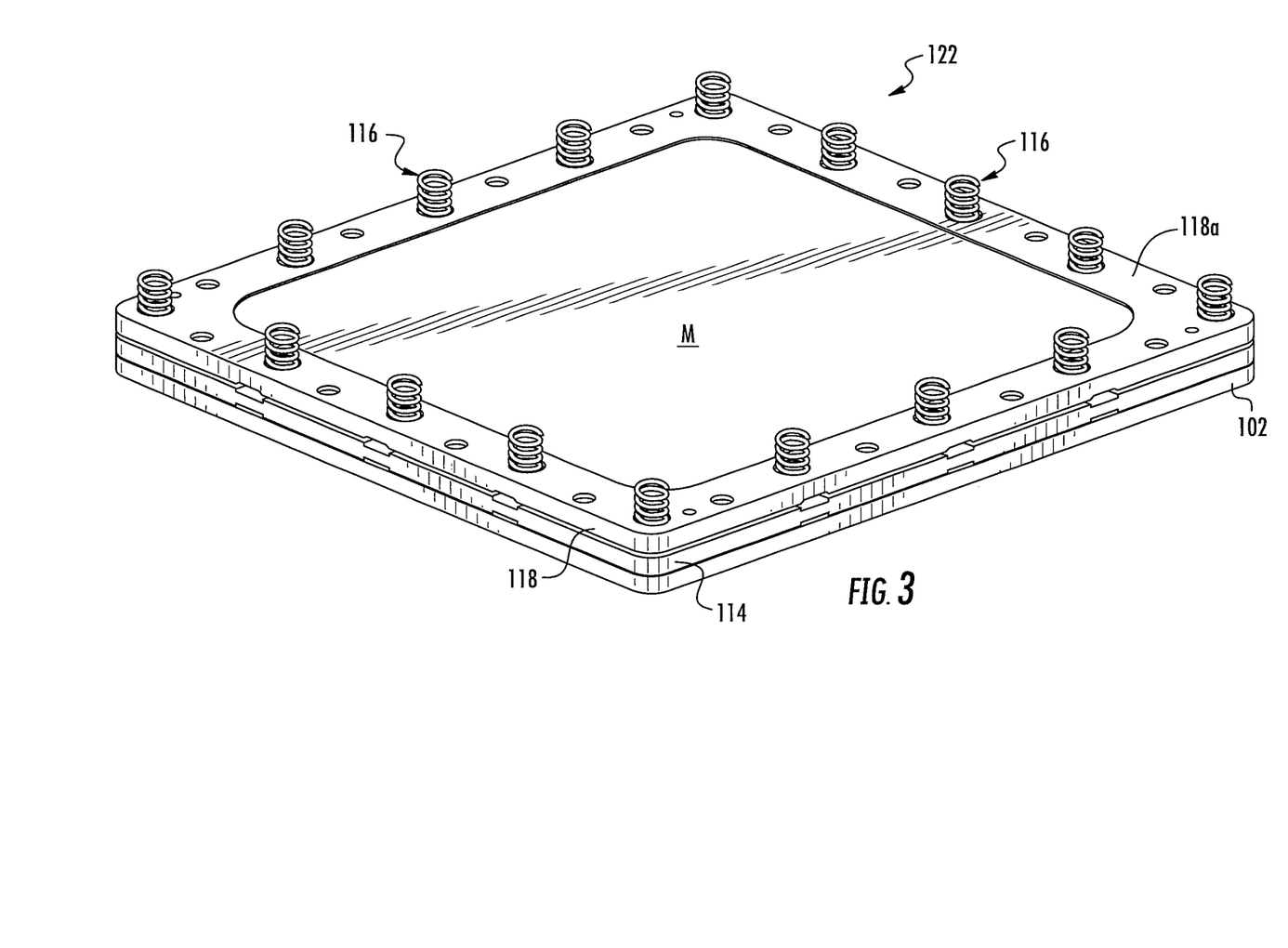
FIG. 3 is a schematic view of a clamping assembly and fixture according to one or more example implementations of the present disclosure.

As shown in FIG. 2, a first, or lower, clamping portion, or frame, generally 114 defines a first, or lower, die-receiving opening, 114f, and a second, or upper, clamping portion, or frame, generally 118, defines a second, or upper, die-receiving opening, 118f. And, at least one fastener, generally 120, such as a bolt, screw, etc., is adapted to secure together lower clamping frame 114 and second clamping frame 118 with the material, generally M, (FIGS. 3, 3A, 4A, and 5A) therebetween to form a clamping assembly, generally 122 (FIGS. 3 and 4) wherein lower clamping frame 114 is adapted to receive the material and to expose the material to the lower die-receiving opening 114f. Lower die-receiving opening 114f is adapted to receive at least one of the lower die 106 and upper die 110, in that during formation of item 124 from material M, lower die 106 could potentially remain static while upper die 110 moves toward lower lie 106, upper die 110 could remain static as lower die 106 moves toward upper die 110 and/or lower die 106 and upper die 110 could both move toward each other, depending on the particular application.

Upper clamping frame 118 is adapted to contact the material and to expose the material to upper die-receiving opening 118f. Upper clamping frame 118 is adapted to receive at least one of the lower die 106 and upper die 110. Also, at least one of the lower die 106 and the upper die 110 are adapted to move toward each other such that the upper surface 106b of lower die 106 and the lower surface 110a of second die 110 substantially simultaneously contact, via lower die-receiving opening 114f and upper die-receiving opening 118f, respectively, to form the material M into item 124, having portions defined therein generally replicating portions of lower profile 106c and the upper profile 110c.

Another example implementation of system 100 may include lower clamping frame 114 including an upstanding flange, generally 114e (FIGS. 2, 3A, 4A, 5A, and 6), extending substantially adjacent to and substantially about the perimeter of the lower die-receiving opening 114f. An upper clamping frame 118 includes recess 118e (FIGS. 3A, 4A, 5A, and 6) that cooperates with frame 114c and which extends substantially adjacent to and substantially about the perimeter of the upper die-receiving opening 118f, wherein recess 118e is adapted to receive flange 114e of the lower clamping frame 114, and upon flange 114e being received within recess 118e, the material is substantially restrained from flowing from clamping assembly 122, should the material become viscous and flow before, during and/or after the forming of item 124.

Figure 3A:
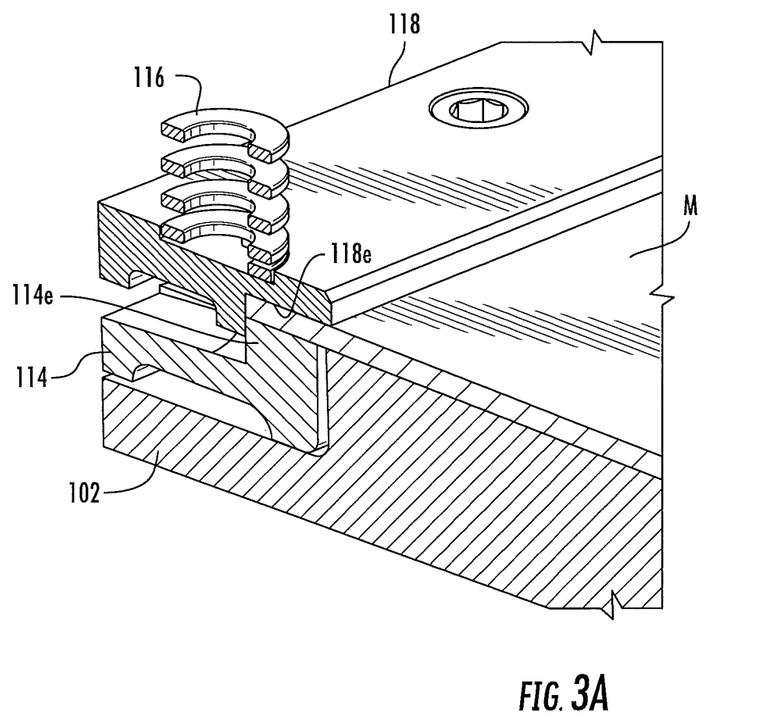
FIG. 3A is a schematic sectional view of a clamping assembly and a fixture according to one or more example implementations of the present disclosure.
Figure 4:
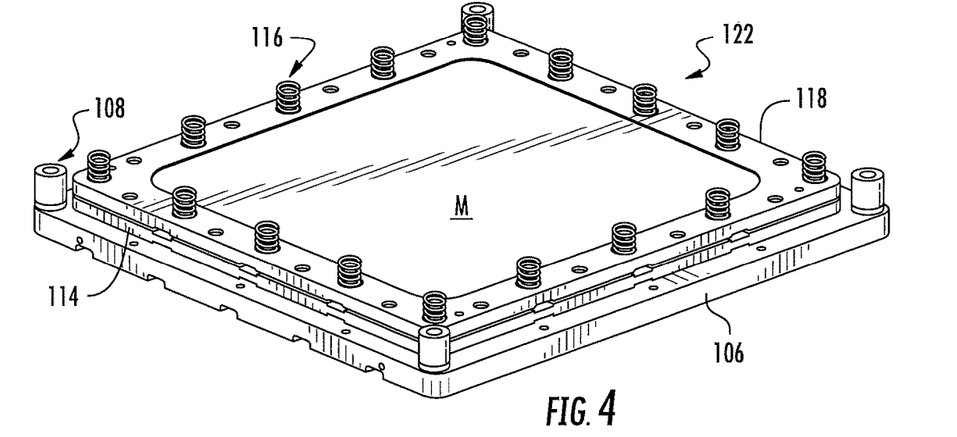
FIG. 4 is a schematic perspective view of a clamping assembly and a first, or lower, die portion, according to one or more example implementations of the present disclosure.

As shown in FIG. 3A, in some example implementations, system 100 may also include a fixture 102 and lower clamping frame 114 being adapted for placement in a generally mating relationship on fixture 102. Also, as shown in FIGS. 3, 3A, 4, 4A, and 5A, clamping assembly 122 may be adapted to hold material M in tension substantially across both, or at least one, of the lower die-receiving opening 114f and upper die-receiving opening 118f.

As shown in FIGS. 2, 3, 5A, and 6, in some example implementations, system 100 may further include at least one spring device, generally 116, connected to upper surface 118a of upper clamping frame 118 adapted to contact the lower surface 110a of the upper die 110 and/or passage 110g (FIGS. 5A and 6) therein as at least one of the lower die and the upper die move toward each other. In one example, an multiple spring devices 116 can be placed along the upper surface 118a of upper clamping frame 118 and could be of a generally coil spring construction and configured to bear against on a one or more shims 116a in passage 110g (FIG. 5A) of upper die 110, to allow for selective adjustment (by selectively varying the number and/or thickness of shims 116a) of the effective force of such spring device 116 on upper die 110 as upper die 110 and/or lower die 106 move toward one another for the purpose of forming item 124 from material M.

As shown in FIGS. 1, 1A, 2, 4, and 6, at least one adjustable stop device 108 extends from the upper surface 106b of lower die 106 and is adapted to contact the lower surface 110a of upper die 110, as at least one of the lower die 106 and upper die 110 move toward each other. In one example, an adjustable stop device 108 can be placed at each corner of lower die 106 and could be of a generally rigid construction stop devices 108 can be configured to rest on a one or more stop shim 108a (FIG. 6) for allowing selective adjustment (by selectively varying the number and/or thickness of shims 108a) of the effective height of such stop device 108 with respect to upper surface 106a, which, in turn, sets the lower-most travel distance of upper die 110 in the case where upper die 110 moves relative to lower die 106, and otherwise, sets the separation distance between the upper and lower dies.

Figure 4A:
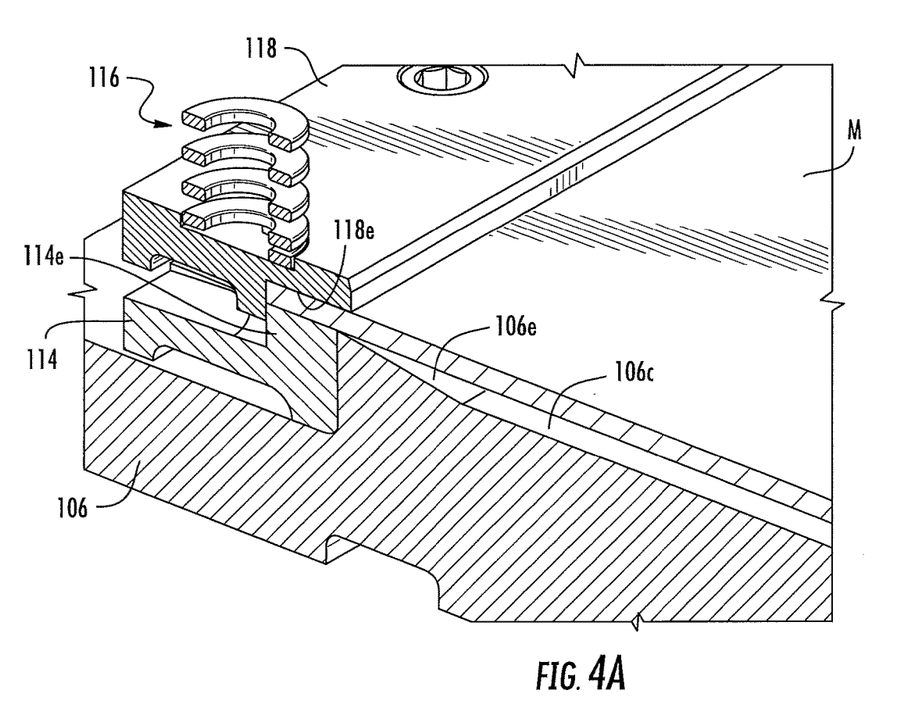
FIG. 4A is a schematic sectional view of the clamping assembly and lower die portion shown in FIG. 4.
Figure 6:
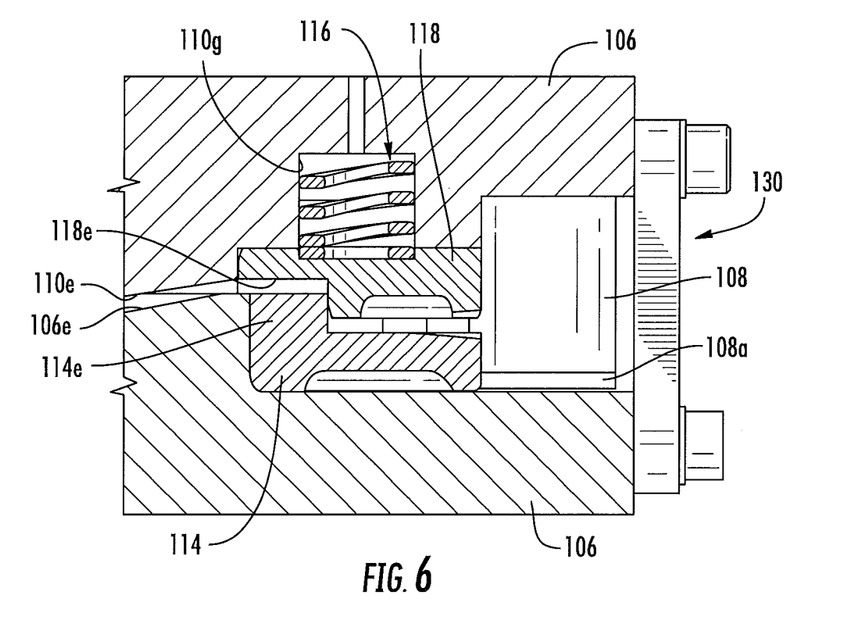

As shown in FIGS. 4A, 5A, and 6, in some example implementations, system 100 may include the lower profile 106c of lower die 106 including a generally peripherally-extending first ramp 106e inclined from the general direction of upper surface 106b of the lower die 106 toward lower surface 106a of lower die 106. Additionally, the second profile 110c of the upper die 110 may include a generally peripherally-extending second ramp 110e inclined from the general direction of lower surface 110b of upper die 110 toward upper surface 110a of upper die 110, wherein the first ramp 106e is configured such that the material M is forced against first ramp 106e during formation of item 124 as the upper and lower dies contact material M. Second ramp 110e is also configured such that material M is forced against first ramp 106e, as lower die 114 and upper die 118 contact material M.

Moreover, in another example implementation, first ramp 106e is inclined at a first angle, and second ramp 110e is inclined at a second angle, and the first angle and the second angle mirror one another such that the respective surface of each ramp 106e, 110e remain generally parallel as lower die 114 and upper die 118 experience relative movement toward and with respect to one another during formation of item 124.

As shown in FIGS. 1, 2, and 6, one or more die alignment devices, generally 130, may be attached to the upper die 110 and/or the lower die 106 and facilitate maintaining upper die 110 and lower die 106 in general alignment as lower die 114 and upper die 118 experience relative movement toward and with respect to one another, and also during the forming of item 124 under the pressure of upper and lower dies 110, 106. More specifically, die alignment devices 130 serve to facilitate alignment of upper and lower dies 110, 106 such that the first profile 106c and the second profile 110c are properly oriented with respect to one another for impression on material M to form item 124.

According to a further aspect of example implementations of the present disclosure, a method is set forth for forming item 124 and includes placing lower clamping frame 114 on fixture 102 for staying purposes and placing thereon material M. Upper clamping frame 118 is placed on or substantially adjacent the material. Upper clamping frame 118, lower clamping frame 114, and material M therebetween are subsequently secured together to form clamping assembly 122. Clamping frame 122 is secured using one or more fasteners 120.

In one implementation, material M is stretched across the die-receiving opening of lower clamping frame 114 and/or upper clamping frame 118 prior to fastening upper and lower clamping frames 118, 114 together. If the material, such as a thermoplastic resin, contains elongated fibers and/or stretched broken fibers, tension may be placed in the material to remove wrinkles or folds in the material and to make the material taut as the material is clamped in clamping assembly 122, and such tension can be placed in a direction generally parallel to the general direction of such elongated fibers, if desired. Alternately, depending on the application of item 124 and/or other factors, the tension placed in the material could be in a direction generally transverse to, or at an oblique angle with respect to, the general direction of the elongated fibers.

Figure 10:
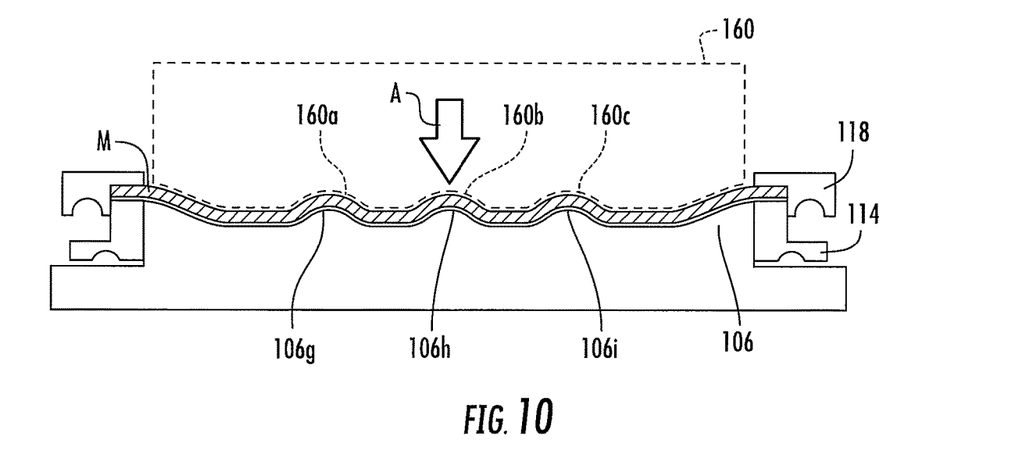
FIG. 10 is a schematic view of preforming material in a clamping assembly, according to one or more example implementations of the present disclosure.

In another example implementation, as shown schematically in FIG. 10, the proper amount of material M to be impressed by upper and lower dies 110, 106 for forming example item 124 could be approximated by forcing the material M against the first profile 106c and/or second profile 110c, as the case may be, using a preforming member 160 applying force in the direction of arrow A, prior to and/or during the tightening of fasteners 120, in order to draw-in a sufficient quantity of the material to within the die-receiving openings 106f, 110f. Preforming member 160 may include, in the case of the forming of an item such as item 124, a profile or face with indentions 160a, 106b, and 160c corresponding to projections 106g, 106h, and 106i in the lower die portion 106. This preforming of material M serves to reduce the likelihood that material M is overstressed or torn as item 124 is formed upon the contact therewith of upper die 110 and lower die 106. It is to be understood that the configuration of preforming member 160 would vary depending on the item to be produced and is not limited to the configuration configured in FIG. 10. For example, a preforming member 160 may be provided having a face with indentions 160a, 106b, and 160c (which correspond to projections 106g, 106h, and 106i in the lower die portion 106) to create, upon application of force to the material M in the direction of arrow A an item such as item 124 currently shown in FIG. 7.

After the material is clamped, perhaps under tension as set forth above, clamping assembly 122 is removed from staging on fixture 102 and placed on at least one of lower die 106 and upper die 110. At least one of lower die 106 and upper die 110 is then moved toward the other, or both toward each other, such that upper surface 106b of lower die 106 and lower surface 110a of upper die 110 substantially simultaneously contact and form material M into item 124, generally replicating thereon the first profile 106c and the second profile 110c.

In some example implementations, the method may also include engaging lower surface 110a of upper die 110 with one or more spring devices 116 on upper clamping frame 118 to provide a clamping force on clamping assembly 122 in order to further secure material M in clamping assembly 122.

In some example implementations, the method may also include engaging one or more stop devices 108 provided on lower die 106 with lower surface 110a of upper die 106, upon at least one of lower die 106 and upper die 110 moving toward the other, or both toward each other.

In some example implementations, the method may further include the first ramp 106e and the second ramp 110e acting in concert to stretch and/or elongate material M as material M is pressed by the upper and lower dies, for facilitating the orientation of the fibers in the material, in the case where the material contains elongated fibers.

In additional example implementations, the method may additionally include trimming material M which may extend beyond at least one of the lower clamping frame and the upper clamping frame of the clamping assembly 122, prior to material M being pressed by the upper and lower dies 110, 106. At least one of the upper and lower dies may be heated prior to or during the moving one or both of the upper and lower dies toward each other in order to enhance formation of material M into item 124, particularly in the case where material M is a thermoplastic material. Moreover, depending on the item 124 to be produced, or if otherwise desired, material M may be held between the upper and lower dies, or against at least one of them, for a predetermined time, at a predetermined pressure and/or at a predetermined temperature in order to cure the material and/or item 124 to a predetermined extent.

In further example implementations, the method may, moreover, include cutting detaching item 124 from the material held in clamping assembly 122 after item 124 is formed. It should be noted that item 124 is shown for example purposes only, and the present disclosure is not to be limited to the shape or profiles of item 124, it being further understood that the shape and profiles of item 124 do not necessarily correlate with the profiles 106c and 100c otherwise disclosed herein.

Figure 8:
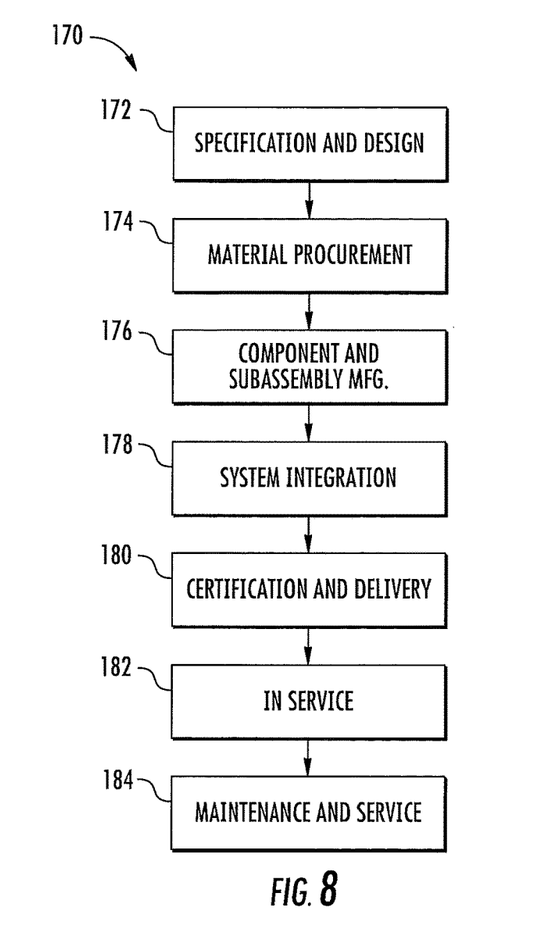
FIG. 8 is a flow diagram of an example aircraft production and service methodology.
Figure 9:
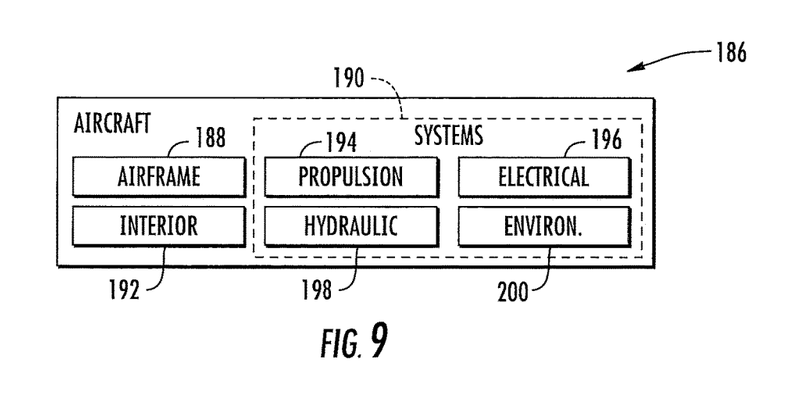
FIG. 9 is a block diagram of an example aircraft.

Example embodiments of the disclosure may find use in a variety of potential applications, particularly in the transportation industry, including for example, aerospace, marine and automotive applications. Thus, referring now to FIGS. 8 and 9, example embodiments may be used in the context of an aircraft manufacturing and service method 170 as shown in FIG. 8, and an aircraft 186 as shown in FIG. 9. During pre-production, example method may include specification and design 172 of the aircraft and material procurement 174. In one example, specification and design of the aircraft may include technology development and product definition, which may in turn include a test and evaluation component in which example embodiments may be employed. Example embodiments may also be employed in model scale test during technology and product development testing such as, for example, on a test model and/or on the walls or other mountable locations of a test facility (e.g., wind tunnel).

During production, component and subassembly manufacturing 176 and system integration 178 of the aircraft takes place. Thereafter, the aircraft may go through certification and delivery 180 in order to be placed in service 182. While in service by a customer, the aircraft is scheduled for routine maintenance and service 184 (which may also include modification, reconfiguration, refurbishment, and so on).

Each of the processes of method 170 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization and so on.

As shown in FIG. 8, the aircraft 186 produced by example method 170 may include an airframe 188 with a plurality of systems 190 and an interior 192. Examples of high-level systems may include one or more of a propulsion system 194, an electrical system 196, a hydraulic system 198 or an environmental system 200. Any number of other systems may be included. Although an aerospace example is shown, the principles of the present disclosure may be applied to other industries, such as the automotive industry.

As suggested above, the apparatus and methods embodied herein may be employed during any one or more of the stages of the production and service method 170. For example, components or subassemblies corresponding to production process 116 may be fabricated or manufactured in a manner similar to components or subassemblies produced while the aircraft 186 is in service. Also, one or more apparatus embodiments, method embodiments or a combination thereof may be utilized during the production stages 176 and 178, for example, by substantially expediting assembly of or reducing the cost of an aircraft. Similarly, one or more of apparatus embodiments, method embodiments or a combination thereof may be utilized while the aircraft is in service, for example and without limitation, to maintenance and service 184.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for forming an item, the method comprising:
placing a first clamping portion on a fixture;

placing a material from which to form the item on the first clamping portion;

placing a second clamping portion substantially adjacent the material;

securing together the second clamping portion, the first clamping portion, and the material therebetween to form a clamping assembly;

removing the clamping assembly from the fixture;

placing the clamping assembly on at least one of a first die portion having a first profile and a second die portion having a second profile;

moving at least one of the first die portion and the second die portion toward each other such that a second surface of the first die portion and a first surface of the second die portion substantially simultaneously contact the material and form the material into the item generally replicating the first profile and the second profile;

engaging the first surface of the second die portion with a spring device coupled with the second clamping portion to provide a clamping force on the clamping assembly during the step of moving at least one of the first die portion and the second die portion toward each other; and coupling a die alignment device to the first die portion and the second die portion to substantially align the first profile and the second profile with one another as the first and second die portions experience relative movement with respect to one another, wherein the die alignment device comprises a plate, a first fastener coupling the plate to the first die portion, and a second fastener coupling the plate to the second portion.

2. The method of claim 1, wherein the material includes elongated fibers therein.

3. The method of claim 1, further comprising:
curing the item while at least one of the second surface of the first die portion and the first surface of the second die portion contacts the material.

4. The method of claim 2, further comprising:
placing the material in tension to generally align the elongated fibers with respect to one another during the step of securing together the second clamping portion, the first clamping portion, and the material therebetween to form the clamping assembly.

5. The method of claim 1, further comprising:
engaging a stop device on the first die portion with the first surface of the second die portion during the step of moving at least one of the first die portion and the second die portion toward each other.

6. The method of claim 1, further comprising:
the first profile of the first die portion including a generally peripherally extending first ramp inclined from proximate the second surface of the first die portion toward a first surface of the first die portion; and the step of moving at least one of the first die portion and the second die portion toward each other including forcing the material against the first ramp of the first die portion.

7. The method of claim 6, wherein the second profile of the second die portion includes a generally peripherally extending second ramp inclined from proximate the first surface of the second die portion toward a second surface of the second die portion.

8. The method of claim 1, further comprising:
selectively adjusting the spring device to extend a predetermined distance from the second clamping portion using a spring shim;

engaging the spring device with the first surface of the second die portion during the step of moving at least one of the first die portion and the second die portion toward each other; and maintaining a force against the material in the clamping assembly, using the spring device and the shim, sufficient to substantially prevent movement of the material relative to the first clamping portion and the second clamping portion during the step of moving at least one of the first die portion and the second die portion toward each other.

9. The method of claim 1, further comprising:
selectively adjusting an adjustable stop device to extend a predetermined distance from the second clamping portion, using a stop shim; and engaging the stop device with the first surface of the second die portion during the step of moving at least one of the first die portion and the second die portion toward each other.

10. The method of claim 1, further comprising:
trimming material extending beyond at least one of the first clamping portion and the second clamping portion of the clamping assembly.

11. The method of claim 1, further comprising:
heating at least one of the first die portion and the second die portion prior to or during the step of moving at least one of the first die portion and the second die portion toward each other to form the material into the item.

12. The method of claim 1, further comprising:
forcing the material against at least one of the first profile and the second profile in order to draw in a sufficient quantity of the material to within at least the first clamping portion such that the material is not overstressed or torn, prior to the step of moving at least one of first die portion and the second die portion toward each other and forming the material into the item having generally the first profile and the second profile.

13. The method of claim 1, wherein the material is a fiber-reinforced thermoplastic material having stretched broken fibers.

14. The method of claim 13, further comprising:
placing the fiber-reinforced thermoplastic material in tension to generally orient the stretched broken fibers during the step of securing together the second clamping portion, the first clamping portion, and the material therebetween to form the clamping assembly; and curing the material after the second surface of the first die portion and the first surface of the second die portion substantially simultaneously contact the material and form the material into the item.

15. The method of claim 13, further comprising:
elongating the material a predetermined amount during the step of moving at least one of first die portion and the second die portion toward each other.

16. The method of claim 13, further comprising:
detaching the item from the material held in the clamping assembly after the step of moving at least one of the first die portion and the second die portion toward each other and forming the material into the item having generally the first profile and the second profile.

17. A method for forming an item, the method comprising:
placing a first clamping portion on a fixture;
placing a material from which to form the item on the first clamping portion, wherein the material comprises elongated fibers;

placing a second clamping portion substantially adjacent the material;

placing the material in tension to generally align the elongated fibers with respect to one another while securing together the second clamping portion, the first clamping portion, and the material therebetween to form a clamping assembly;

removing the clamping assembly from the fixture;

placing the clamping assembly on at least one of a first die portion having a first profile and a second die portion having a second profile;

moving at least one of the first die portion and the second die portion toward each other such that a second surface of the first die portion and a first surface of the second die portion substantially simultaneously contact the material and form the material into the item generally replicating the first profile and the second profile;

engaging the first surface of the second die portion with a spring device coupled with the second clamping portion to provide a clamping force on the clamping assembly during the step of moving at least one of the first die portion and the second die portion toward each other;

coupling a die alignment device to the first die portion and the second die portion to substantially align the first profile and the second profile with one another as the first and second die portions experience relative movement with respect to one another, wherein the die alignment device comprises a plate, a first fastener coupling the plate to the first die portion, and a second fastener coupling the plate to the second portion; and curing the item while at least one of the second surface of the first die portion and the first surface of the second die portion contacts and the material.

18. A method for forming an item, the method comprising:

placing a first clamping portion on a fixture;

placing a material from which to form the item on the first clamping portion;

placing a second clamping portion substantially adjacent the material;

securing together the first clamping portion, the second clamping portion, and the material therebetween to form a clamping assembly;

removing the clamping assembly from the fixture;

placing the clamping assembly on at least one of a first die portion having a first profile and a second die portion having a second profile, the first profile of the first die portion including a generally peripherally extending first ramp inclined from proximate a second surface of the first die portion toward a first surface of the first die portion, and the second profile of the second die portion including a generally peripherally extending second ramp inclined from proximate a first surface of the second die portion toward a second surface of the second die portion;

forcing the material against at least one of the first profile and the second profile in order to draw in a sufficient quantity of the material to within at least the first clamping portion such that material is not over-stressed or torn;

moving at least one of the first die portion and the second die portion toward each other such that the second surface of the first die portion and the first surface of the second die portion substantially simultaneously contact the material, force the material against the first ramp of the first die portion, and form the material into the item generally replicating the first profile and the second profile;

engaging the first surface of the second die portion with a spring device coupled with the second clamping portion to provide a clamping force on the clamping assembly during the step of moving at least one of the first die portion and the second die portion toward each other; and coupling a die alignment device to the first die portion and the second die portion to substantially align the first profile and the second profile with one another as the first and second die portions experience relative movement with respect to one another, wherein the die alignment device comprises a plate, a first fastener coupling the plate to the first die portion, and a second fastener coupling the plate to the second portion.

19. The method of claim 1, further comprising directly engaging the first surface of the second die portion with the spring device coupled with the second clamping portion.

20. The method of claim 1, further comprising tightening fasteners to draw-in a sufficient quantity of the material with respective openings of the first and second clamping portions.

21. The method of claim 1, wherein the die alignment device comprises a third fastener coupling the plate to the first die portion, wherein the first and third fasteners are parallel to a plane extending through the first die portion.

22. The method of claim 1, wherein the clamping assembly is removed from the fixture and placed on at least one of the first die portion and the second die portion after the material is clamped by the clamping assembly.

* * * * *